US010447196B2

(12) United States Patent
Kudanowski

(10) Patent No.: US 10,447,196 B2
(45) Date of Patent: Oct. 15, 2019

(54) MOTOR BRIDGE DRIVER CIRCUIT

(71) Applicant: TRW Limited, Solihull West Midlands (GB)

(72) Inventor: Maciej Kudanowski, Solihull (GB)

(73) Assignee: TRW Limited, Solihull, West Midlands (GB)

( * ) Notice: Subject to any disclaimer, the term of this patent is extended or adjusted under 35 U.S.C. 154(b) by 0 days.

(21) Appl. No.: 15/122,270

(22) PCT Filed: Feb. 25, 2015

(86) PCT No.: PCT/GB2015/050540
§ 371 (c)(1),
(2) Date: Aug. 29, 2016

(87) PCT Pub. No.: WO2015/128639
PCT Pub. Date: Sep. 3, 2015

(65) Prior Publication Data
US 2016/0373051 A1 Dec. 22, 2016

(30) Foreign Application Priority Data

Feb. 27, 2014 (GB) .................................. 1403411.0

(51) Int. Cl.
*H02P 29/028* (2016.01)
*B60L 3/00* (2019.01)
(Continued)

(52) U.S. Cl.
CPC .......... *H02P 29/028* (2013.01); *B60L 3/0084* (2013.01); *B60L 3/0092* (2013.01);
(Continued)

(58) Field of Classification Search
CPC ........ H02P 25/22; H02P 29/032; H02P 27/08; H02P 29/024; H02P 29/028; H02P 6/12;
(Continued)

(56) References Cited

U.S. PATENT DOCUMENTS 3,959,638 A * 5/1976 Blum ...................... G06F 11/20
714/11
5,828,972 A * 10/1998 Asanuma ............... B62D 5/006
701/41
(Continued)

FOREIGN PATENT DOCUMENTS

DE 19934880 C1 1/2001
EP 0601424 A2 6/1994
(Continued)

OTHER PUBLICATIONS

Great Britain Search Report, Application No. GB 1403411.0, dated Sep. 8, 2014.
(Continued)

*Primary Examiner* — Thai T Dinh
(74) *Attorney, Agent, or Firm* — MacMillan, Sobanski & Todd, LLC

(57) ABSTRACT

A motor bridge driver integrated circuit comprises a first set of input ports arranged to receive control signals from a first microprocessor, a second set of input ports arranged to receive control signals from a second microprocessor, and at least one set of output ports arranged to output motor phase switching signals to the switches of a motor bridge. A diagnostic circuit receives and monitors the control signals received from the two microprocessors and from those signals determines which microprocessor is to be treated as a master and which is to be treated as a slave at any given time by the motor bridge driver. An arbitration circuit selectively enables only the master microprocessor to the take control of the motor bridge at any given time while preventing the slave microprocessor from taking control of the motor bridge.

9 Claims, 3 Drawing Sheets

(51) Int. Cl.
*H02P 27/06* (2006.01)
*H02P 29/032* (2016.01)
*H02P 27/08* (2006.01)
*H02H 7/08* (2006.01)

(52) U.S. Cl.
CPC .............. *H02P 27/06* (2013.01); *H02P 27/08* (2013.01); *H02P 29/032* (2016.02); *H02H 7/0844* (2013.01); *Y02T 10/642* (2013.01)

(58) Field of Classification Search
CPC .... H02P 29/026; B60L 15/20; B60L 2210/40; B60L 3/0084; B60L 3/0092
See application file for complete search history.

(56) References Cited

U.S. PATENT DOCUMENTS

| | | | | |
|---|---|---|---|---|
| 6,332,506 | B1 * | 12/2001 | Kifuku | B62D 5/0487 180/404 |
| 6,889,794 | B2 * | 5/2005 | Higashira | B62D 5/0406 180/444 |
| 7,042,180 | B2 * | 5/2006 | Terry | F04B 35/04 318/400.21 |
| 7,427,843 | B2 * | 9/2008 | Kifuku | B62D 5/0457 318/432 |
| 7,433,767 | B2 * | 10/2008 | Takeuchi | B62D 5/003 180/443 |
| 9,685,901 | B2 * | 6/2017 | Tanabe | H02P 29/02 |
| 2002/0148675 | A1 | 10/2002 | Higashira et al. | |
| 2008/0203953 | A1 | 8/2008 | Zhang et al. | |
| 2015/0103682 | A1 | 4/2015 | Becquet et al. | |

FOREIGN PATENT DOCUMENTS

| | | |
|---|---|---|
| EP | 1251058 A2 | 10/2002 |
| FR | 2987528 A1 | 2/2012 |
| JP | 2002052592 A | 2/2002 |
| JP | 2013025765 A | 2/2013 |

OTHER PUBLICATIONS

PCT International Search Report and Written Opinion, Application No. PCT/GB2015/050540, dated May 11, 2015.
CN Second Office Action, Application No. 201580019162.2, filed Nov. 26, 2018.

* cited by examiner

MOTOR BRIDGE DRIVER CIRCUIT

CROSS-REFERENCE TO RELATED APPLICATIONS

This application is the National Phase of International Application PCT/GB2015/050540 filed Feb. 25, 2015 which designated the U.S. and that International Application was published on Sep. 3, 2015 as International Publication Number WO 2015/128639A1. PCT/GB2015/050540 claims priority to United Kingdom Patent Application No. 1403411.0, filed Feb. 27, 2014. Thus, the subject nonprovisional application claims priority to GB 1403411.0, filed Feb. 27, 2014. The disclosures of both applications are incorporated herein by reference.

BACKGROUND OF THE INVENTION

The present invention relates to motor bridge driver circuits for multiphase motor control systems. It is particularly suitable for permanent magnet AC motors, but is also applicable to other types of electric motor such as DC brushless motors, switched reluctance motors and induction motors.

Electric motors are used in a diverse range of applications and one particularly challenging use is in electric power assisted steering systems. A motor, such as a three phase permanent magnet synchronous electric motor, is connected to a part of the steering system, typically the steering shaft that connects the steering wheel of the vehicle to the road wheels. A sensor, such as a torque sensor, produces a signal indicative of the torque applied to the steering wheel by the driver, and this signal is fed into a microprocessor. The microprocessor uses this signal to produce control signals for the motor which are indicative of the torque or current that is required from the motor. These control signals are converted into voltage waveforms for each phase of the motor within the microprocessor, and these in turn are transmitted from the microprocessor to a motor bridge driver.

The motor bridge driver converts the control signals, which are typically low level voltage waveforms, into higher level voltage drive signals that are applied to the respective phases of a motor bridge, usually separate from the bridge driver.

A typical bridge comprises a set of switches that selectively apply voltage from a supply to the phases of the motor as a function of the high level voltage drive signals applied to the switches from the bridge driver circuit. By controlling the switches the current in the motor can be controlled relative to the motor rotor position, allowing the torque produced by the motor to be controlled. The motor in use is thereby caused to apply an assistance torque to the steering system that helps, or assists, the driver in turning of the steering wheel. Because this torque effects the output of the torque sensor, this forms a type of closed loop control allowing accurate control of the motor torque to be achieved.

To help with the control of the motor, the microprocessor for PWM controlled electric motors, especially Permanent magnet synchronous electric motors, generally will also receive a measure of the current flowing through the windings or phases of the motor and this can either be done by means of separate current sensors for each of the phases, or by means of a single current sensor that is placed in the circuit so as to measure the total instantaneous current flowing between a D.C. power supply and the bridge circuit and motor combination.

The measured currents are typically converted within the microprocessor into a rotating d-q frame which rotates with the rotor, and then combined with the current demand signal, which is a function of the demanded torque and the characteristics of the motor, also in the d-q frame, indicative of the current that is demanded from the motor, to produce a current error signal. The error signal represents the difference between the current that is demanded in order to achieve a desired torque and the actual current flowing in the motor. The error signal is fed to a current controller which produces a set a voltage demand signal, also typically in the d-q frame, representative of the voltage to be applied to each phase of the motor that will best drive the error signal towards zero. The d-q voltage signal is then converted into PWM signals for the motor phases depending on which PWM strategy is used. The controller therefore acts to vary the PWM phase voltages in order to try to constantly minimise the magnitude of the error signal thereby ensuring that the motor current is as close as possible to the demanded current.

Motor drive circuits using feedback control and PWM are well known in the art. For example WO2006005927, discloses a typical system and the teaching of that document is incorporated herein by reference. The general layout of the control system is shown in FIG. 2 of the drawings.

It has been appreciated that with the system as described above there is a potential weakness in that a single component may fail leading to a loss of assistance from the motor. For instance, if the supply voltage to the microprocessor drops to a level at which the performance of the microprocessor is impaired, incorrect control signals may be provided. An internal fault in the microprocessor may also result in an incorrect function of the controller and lead to the microprocessor supplying incorrect command signals to the bridge driver circuit.

An object of the present invention is to ameliorate the possible problems associated with faults in the prior art arrangement described above.

SUMMARY OF THE INVENTION

According to a first aspect the invention provides a motor bridge driver integrated circuit comprising:

a first set of input ports arranged to receive control signals from a first microprocessor, a second set of input ports arranged to receive control signals from a second microprocessor, at least one set of output ports arranged to output motor phase switching signals to the switches of a motor bridge;

a diagnostic circuit which receives and monitors the control signals received from the two microprocessors and from those signals determines which microprocessor is to be treated as a master and which is to be treated as a slave at any given time by the motor bridge driver, and an arbitration circuit that selectively enables only the master microprocessor to the take control of the motor bridge at any given time whilst preventing the slave microprocessor from taking control of the motor bridge.

By the term "take control of the motor bridge" we mean that the control signals from the microprocessor that is the master are converted into the required signals for controlling the bridge switches whilst the control signals from the other microprocessor do not influence the generation of the bridge switching signals.

The integrated motor bridge driver circuit therefore enables two microprocessors to control a motor bridge whilst ensuring only the master microprocessor has control of the bridge at any time, and ensuring that both master and slave do not simultaneously try to control the bridge. Arbitration is performed within the integrated circuit by an inbuilt diagnosis and arbitration circuit.

The diagnostic circuit may determine which microprocessor is the master and which is the slave in response to status information received from each of the two microprocessors at the input ports as part of the control signals or alongside the control signals. This status information may include a signal indicative of the health of each microprocessor. Both microprocessors may be monitored periodically and the status of each provided to the other for diagnostic purposes.

The diagnostic circuit may include a watchdog function whereby it is configured so that it always treats one particular microprocessor as the master if that microprocessor indicates that it is healthy but switches to treat the other, slave, microprocessor as the master if the default master supplies status information indicating that it is not healthy or if predetermined time since a last healthy signal from the master microprocessor has elapsed.

Where a watchdog function is provided the circuit may include a timer that is reset when a healthy signal is received and times out if the predetermined time has elapsed raising an error flag.

By healthy we mean that the microprocessor has undertaken one or more tests that have been satisfied by the microprocessor. When these tests have been passed the microprocessor will respond to the watchdog and may do so repeatedly at set time intervals or when challenged by the watchdog when operational.

In addition, or alternatively, the motor bridge driver may be adapted to receive at the input ports signals indicative of the supply voltage applied to each microprocessor, and the diagnostic circuit may be arranged to receive and monitor these signals and to determine that the voltage is within an allowable safe range. In the event that the supply voltage to the microprocessor that is operating as the master is outside of the range the diagnostic circuit may change status to treat the other microprocessor as the master, and if the supply voltage to both falls outside of the range then the bridge driver may shut down the bridge and raise an alarm.

In any case where the diagnostic circuit switches the master microprocessor, and output signal may be fed to a respective output port of the integrated circuit which communicates this change to a respective one of the microprocessors. In practice, both microprocessors may be informed of the change of status.

The motor drive circuit may comprise a single integrated circuit in which the diagnostic circuit, arbitration circuit and bridge driver circuit are provided on a single chip of semiconductor material. This chip may be supported by a printed circuit board that carries signals to and from the circuits to the output ports and from the input ports respectively.

The integrated circuit may include two sets of output ports, each one suitable for connection to a respective motor bridge. The arbitration circuit may supply the signals from the master microprocessor to both bridges simultaneously so that they work in tandem. In the event that a fault in one bridge is detected then the signals may be supplied to only one of the bridges.

The diagnostic circuit may be adapted to receive a signal from each bridge to enable the correct operation of the bridge to be determined. For instance, it may monitor the current flowing in the bridge and/or phase voltage feedback signals.

Alternatively, the microprocessors may monitor the integrity of the bridges and feed a signal indicative of the status of the bridges to the diagnostic circuit. Again, the microprocessors may monitor the current flowing in the bridge to help in determining the integrity of the bridge and/or phase voltage feedback signals.

The integrated circuit may include a first serial peripheral interface bus (SPI) that handles signals to and from the first microprocessor and a second serial peripheral interface (SPI) bus that handles signals from the second microprocessor.

Each SPI may be configured to communicate information from the microprocessor to the bridge driver, under the influence of the arbitration circuit, and optionally to communicate information on the status of the bridge driver back to the respective microprocessor. Optionally information may be communicated back to the respective microprocessors by applying signals to an additional output port of the bridge driver circuit that is connected to a respective one of the microprocessors. Of course, the input ports may also function as the output ports (a combined I/O port).

The arbitration circuit will therefore control the signals that are supplied to each switch of the bridge or bridges, and should be arranged so that any significant fault in one of the microprocessors or in the microprocessor supply cannot adversely influence the signals applied the bridge including any effects due to configuration of the bridge driver effected via the SPI interfaces.

The invention provides for fail operational behaviour of a multiple phase electric motor by enabling two microprocessors to control the bridge driver in a manner that prevents a fault in one microprocessor affecting the ability of the other microprocessor to provide control. Placing the parts of the circuit in an integrated circuit enables a simplified design and implementation of a suitable arbitration and watchdog circuit to be provided and enhances the robustness of the circuit.

According to a second aspect the invention provides a motor circuit comprising:

A multiphase electric motor,

At least one motor bridge that comprises a plurality of switches for selectively connecting each phase of the motor to a supply voltage in response to motor phase switching signals from a motor bridge driver circuit, a first microprocessor that generates a first set of control signals indicative of the voltage waveforms to be applied to each phase of the motor, a second microprocessor that generates a second set of control signals indicative of the voltage waveforms to be applied to each phase of the motor, and an integrated motor bridge driver circuit comprising:

a first set of input ports arranged to receive control signals from the first microprocessor, a second set of input ports arranged to receive control signals from the second microprocessor, at least one set of output ports arranged to output motor phase switching signals to the switches of the motor bridge;

a diagnostic circuit which receives and monitors the control signals received from the two microprocessors and from those signals determines which microprocessor is to be treated as a master and which is to be treated as a slave at any given time by the motor bridge driver, and an arbitration circuit that selectively enables only the master microprocessor to the take control of the motor bridge at any given time whilst preventing the slave microprocessor from taking control of the motor bridge.

Each microprocessor may include a control signal generating circuit that generates control signals that are sent to the bridge driver circuit. These control signals may include, but not be limited to:

One or more inhibit signals that instruct the bridge driver to enter a low power state;

One or more switch control signals that tell the bridge driver the timing for opening and closing the switches of the bridge;

One or more enable signals that instruct the bridge driver to wake from a low power state; and One or more Serial peripheral interface signals that are used to control the timing and synchronisation of signals between the microprocessor and the bridge driver circuit and optionally to include one or more status signals that tell the bridge driver watchdog the status, or health, of the microprocessor.

The bridge driver circuit may be adapted to send to each microprocessor one or more signals that include but are not limited to:

One or more error signals indicating any errors in the function of a part of the bridge driver or bridge;

A current signal dependent upon the current flowing in one or more phases of the motor that is controlled by the bridge driver circuit, One or more Serial peripheral interface signals that are used to control the timing and synchronisation of signals between the microprocessor and the bridge driver circuit.

One or more signals telling the microprocessor that it is acting as a master or as a slave and status information about the bridge driver. E.g. is it in a low power state or awake.

According to a third aspect the invention provides a method of operating a motor using a motor circuit according to the second aspect of the invention, the method comprising:

at a first time designating the first microprocessor as a master micro processor and the second microprocessor as a slave microprocessor;

whereby in the event that the results of the diagnostic analysis indicate that the master microprocessor is functioning correctly causing the arbitration circuit to supply the bridge driver with control signals from the master microprocessor only and in the event that event that the results of the diagnostic analysis indicate that the master microprocessor is functioning correctly causing the arbitration circuit to supply the bridge driver with control signals from the slave microprocessor only.

The method may comprise performing the diagnosis within the microprocessors, within the bridge circuit of within both the microprocessors and bridge circuit.

The method may comprise communicating the diagnostic analysis from the microprocessors to the bridge circuit or from the bridge circuit to the microprocessors, of both.

The method may comprise storing within the microprocessors or the bridge circuit of both information on the status of each microprocessor—master or slave—at any time.

There will now be described, by way of example only, one embodiment of the present invention with reference to and as illustrated in the accompanying drawings of which:

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
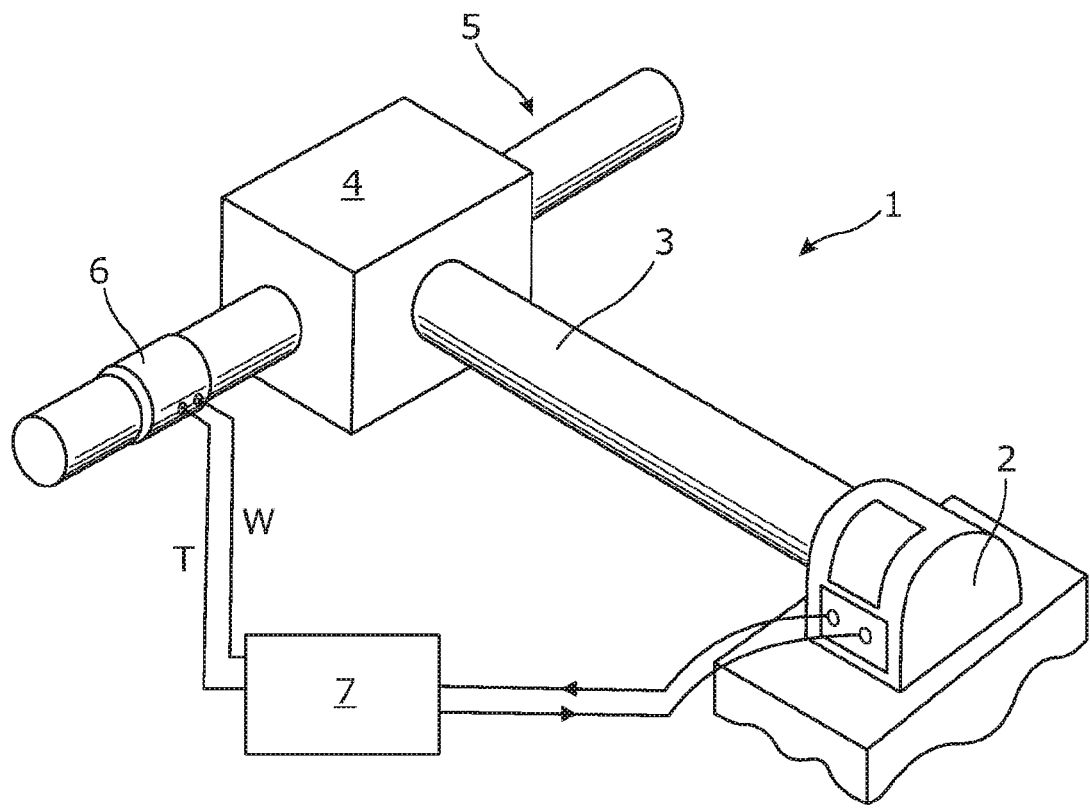
FIG. 1 is an overview of a typical EPAS system that includes a motor and motor drive circuit in accordance with the present invention.

As shown in FIG. 1, a typical application for a multiple phase direct current motor is in an electric power assisted steering system 1. In its basic form this comprises a steering wheel connected through a steering column 5 to the road wheels of a vehicle. The steering wheel and road wheels are not shown, and the steering shaft could be replaced with some other part of the steering between the steering wheel and road wheels such as a steering rack. An output shaft 3 of an electric motor 2 is connected to the shaft 5 by a gearbox 4, usually comprising a worm gear that cooperates with a wheel gear. A torque sensor 6 senses the torque applied to the shaft by the driver as the driver turns the steering wheel, and this measured torque is fed to a controller 7 of a motor drive circuit that is provided within a microprocessor chip. The controller produces motor phase voltages that are applied to the switches of a motor bridge associated with each phase of the motor to cause the motor to produce a torque that assists the driver. This is usually proportional to the measured torque, so that as the driver applies a higher torque the motor provides a higher amount of assistance to help turn the wheel.

Figure 2:
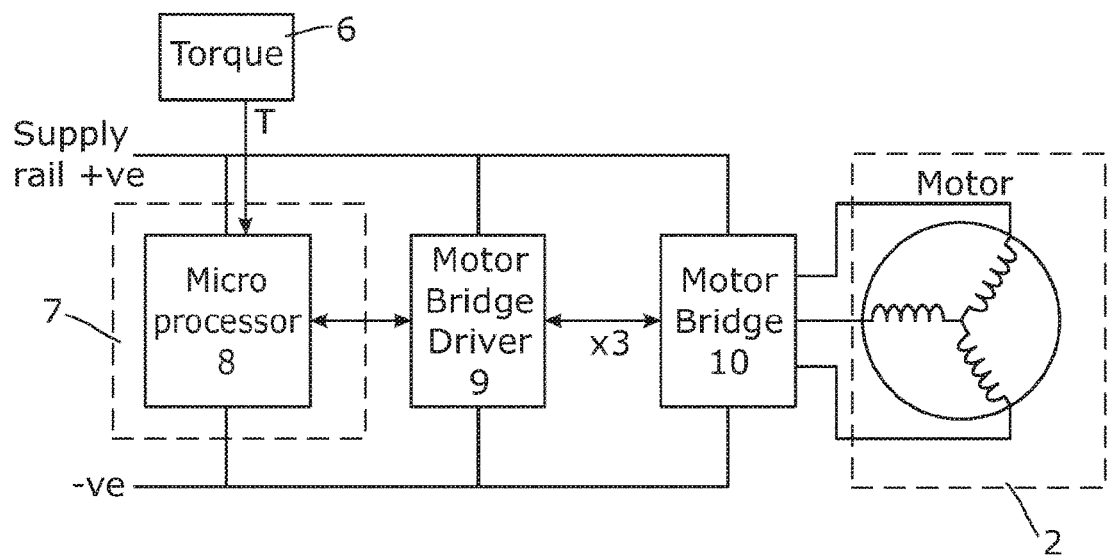
FIG. 2 is a schematic of a typical configuration of a prior art motor drive and control circuit for the system of FIG. 1.

This form of steering system is well known. FIG. 2 shows in more detail the component parts of a typical electrical circuit. The controller comprises a microprocessor 8 that receives the measure torque and a measure of the current flowing in the motor (either in each phase of the overall current into or out of the motor). It also receives a measure of the motor rotor position, or it calculates this internally from the current signals. The rotor position together with current allows the controller to determine the torque that is being applied, and the measure of the torque from the torque sensor is used by the controller to determine what torque it is to demand from the motor. Again this is well known in the art, and many different control strategies and motor phase voltage waveforms to achieve the required torque have been proposed in the art.

The output of the microprocessor 8 will be a set of motor phase voltage waveforms, typically PWM waveforms, that represent the phase voltages that are required by the controller to achieve the desired motor current and hence motor torque. These are low level signals, and are fed from the controller to the inputs of a motor bridge driver circuit 9. The function of the motor bridge driver circuit 9 is to turn the low level signals into the higher level drive signals for the switches of a motor bridge 10. For instance with a three phase motor each phase will be connected to the positive supply through a high switch and the ground through a low switch, only one of which will be connected at any given time according to the pattern defined by the PWM switching waveforms.

Figure 3:
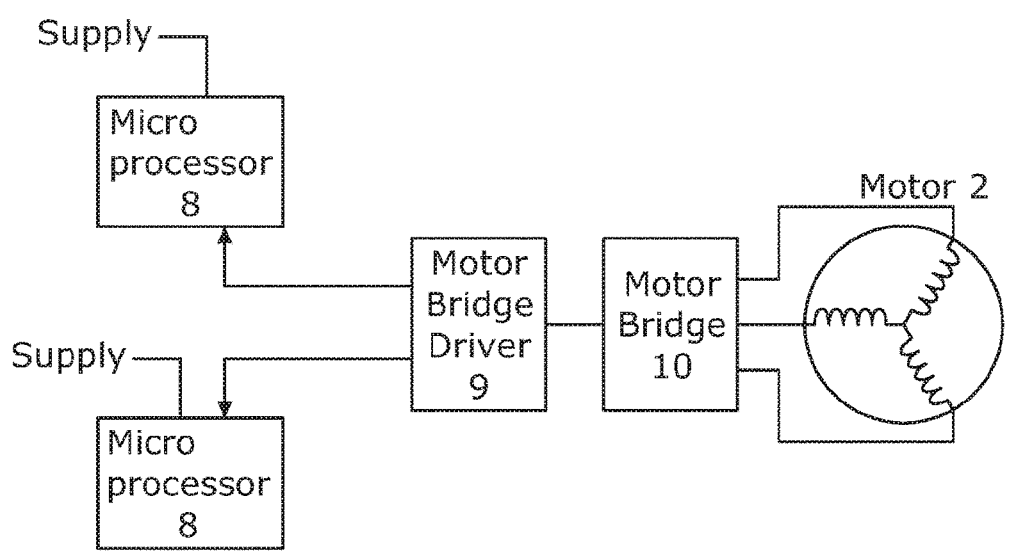
FIG. 3 is a schematic corresponding to FIG. 2 for a configuration in accordance with an aspect of the invention.
Figure 4:
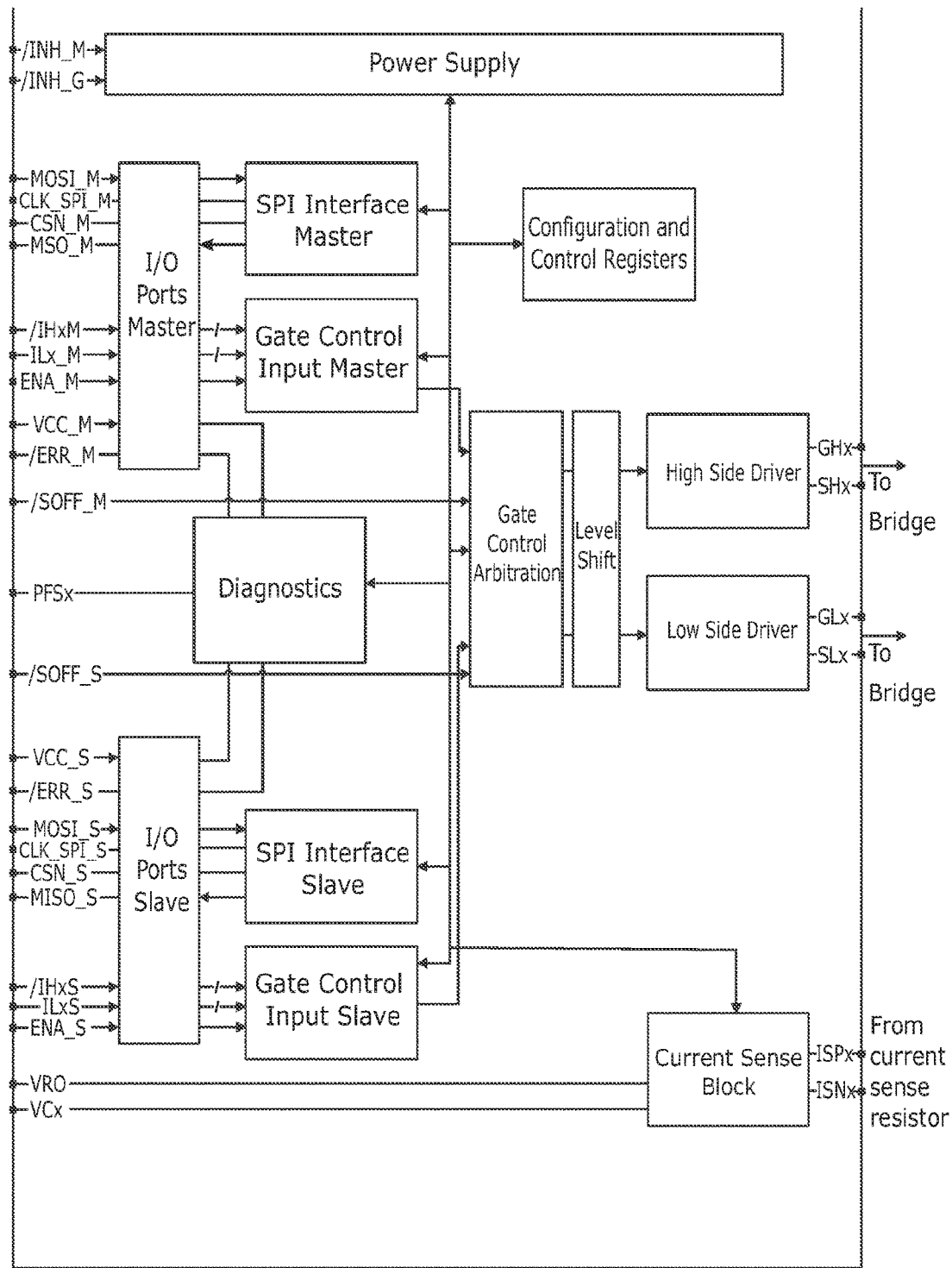
FIG. 4 is a detailed schematic of the internal configuration of the bridge driver circuit of FIG. 3.

FIG. 4 shows in more detail the internal circuitry blocks of an integrated motor bridge driver circuit within the scope of the present invention, and FIG. 3 shows a motor circuit that combines this with two microprocessors to provide an increased level of availability compared with the circuit of FIG. 2.

The integrated bridge driver circuit comprises two sets of input ports, each of which is connected to a respective microprocessor. Both microprocessors in this example are identical and operate entirely independently, each receiving a measure of the motor current (and optionally motor rotor position) as well as the torque measurement signal from the torque sensor. Each determines independently a set of control signals for the motor that represent the PWM waveforms to be applied to each phase, applied to a respective set of input ports. In fact, each "set" of ports could be a single port if the control signals are transmitted serially between the microprocessor and motor bridge circuit.

The bridge circuit 9 and microprocessors 8 each include an SPI interface to facilitate the exchange of control information and status information between them. The motor bridge circuit therefore has two independent SPI interfaces, each of which also communicates information to and from a diagnostic circuit in the bridge circuit and an arbitration circuit. Keeping them independent removes the possibility of a common mode error if one of the SPI circuits is faulty. Additionally, buffering of the signals by the I/O ports interfaces of the bridge driver circuit is done in such a manner as to prevent the propagation of over-voltage faults from the microprocessor to the rest of the bridge driver.

The diagnostic circuit within the bridge driver circuit determines which microprocessor is acting a master at any given time and which is acting as a slave. It does so from information provided to it by the microprocessor, including status information supplied by the microprocessors (i.e. "I am the master") but also, or alternatively, by monitoring the control signals and other signals that are representative of the health of the microprocessors. This includes monitoring the supply voltage to each microprocessor VCC_MS.

As shown in FIG. 5 a number of other signals are received at the bridge circuit from the motor and microprocessor as follows, where generally the suffix M means to/from master and S means to and from slave, (x denotes one of a number of channels).

/INH_M(S)—Inhibit signal from Microprocessor to THE BRIDGE DRIVER—puts THE BRIDGE DRIVER in low power state. Either micro is able to wake the THE BRIDGE DRIVER but both need to satisfy it to put it into low power mode.

MOSI_M(S), CLK_SPI_M, CSN_M(S) and MISO_M(S) are the standard SPI interface signals. Used for communication between the microprocessor and THE BRIDGE DRIVER as described below.

/IHx_M(S) are the three high side FET control signals form the microprocessor to THE BRIDGE DRIVER. THE BRIDGE DRIVER translates them into three gate drive signals GHx—these connect the the MOSFET gates to switch the gate MOSFETs. The logic described below determines if master or slave signals are used.

ILx_M(S) as above but for low side in conjunction with GLx.

ENA_M(S)—Enable signal that is a request from the micro to THE BRIDGE DRIVER to enter normal operation. ENA_M(S) signals (as well as other interfaces) are ignored for the master or slave not currently satisfying the SPI WD interface. Thus the not-in-charge (slave) microprocessor is not able to prevent correct operation of the system by the other microprocessor.

VCC_M(S)—The bridge driver monitors the VCC supply of the microprocessor.

/ERR_M(S)—Error signalling form THE BRIDGE DRIVER to micro. Detailed error information may be read over SPI /SAFE_OFF_M(S)—safety turn off of output stages. The in-charge microprocessor is able to effect a fast disablement of gate drivers in the event of a system fault. Not-in-charge microprocessor input is ignored.

PHASE_FBx—3 phase feedback signals to the microprocessor are a signal-conditioned versions of the state of the phase lines derived from the three SHx signals.

I_SENSEx—current sense feedback to microprocessor derived from ISPx and ISNx current amplifier input signals.

In one representative arrangement, the microprocessors each send status information to the diagnostic circuit indicating whether the microprocessor is healthy or in fault. This information is sent at set time intervals, and the diagnostic circuit functions as a watchdog monitoring this signal. If it is received before the watchdog timer times out, no change in status is made. Whichever microprocessor was acting a master will continue to be treated as the master by the bridge driver circuit. If the watchdog times out from the master (no signal received in time) but a signal is received in time from the slave microprocessor then the bridge driver circuit will switch to make the slave the master. If no signal is received from either microprocessor the diagnostic circuit will instruct the arbitration circuit to remove control of the bridge from both microprocessors, shutting down the motor, and raise an error flag.

A similar change in status will be made by the diagnostic circuit in the supply voltage to the master microprocessor falls outside of a predefined safe range, or above or below a safe limit. A switch will be made to make the slave the master unless the voltage to that microprocessor is also outside of the safe range or above or below a safe limit.

The arbitration circuit receives the information on which is the master from the diagnostic circuit or the microprocessors (via the SPIs) and from this controls which of the controls signals are used to control the bridge driver circuit and in turn the bridge. Only the master is allowed to control the bridge, and the arbitration circuit controls the switch over from one microprocessor to the other in the event of a change in status.

Sending status information from the bridge driver to the microprocessors may be beneficial when flagging a critical fault as it will enable the fault to be flagged faster than it could be checked by the SPI. For instance, the SPI may check the internal registers of the bridge driver and report back but this is often slow and only happens periodically.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. A motor bridge driver integrated circuit comprising:
   a first set of input ports arranged to receive control signals from a first microprocessor,
   a second set of input ports arranged to receive control signals from a second microprocessor,
   a motor bridge driver including at least one set of output ports arranged to output motor phase switching signals to a motor bridge;
   a diagnostic circuit which receives and monitors the control signals received from the two microprocessors and from those signals determines which microprocessor is to be treated as a master microprocessor and which is to be treated as a slave microprocessor at any given time by the motor bridge driver, and
   an arbitration circuit that selectively enables only the master microprocessor to the take control of the motor bridge at any given time whilst preventing the slave microprocessor from taking control of the motor bridge, wherein the diagnostic circuit, arbitration circuit and motor bridge driver are provided as a single integrated circuit on a single chip of semiconductor material.

2. The motor bridge driver integrated circuit according to claim 1 in which the diagnostic circuit in use determines which microprocessor is the master microprocessor and which is the slave microprocessor in response to status information received from each of the two microprocessors at the input ports as part of the control signals or alongside the control signals.

3. The motor bridge driver integrated circuit according to claim 1 in which the diagnostic circuit is configured to treat one particular microprocessor as the master microprocessor if that microprocessor indicates a healthy state but switches to treat the other slave microprocessor as the master microprocessor if the default master microprocessor supplies status information indicating that it is not healthy or if predetermined time since a last healthy signal from the master microprocessor has elapsed.

4. The motor bridge driver integrated circuit according to claim 1 which is adapted to receive signals at the first and second set of input ports indicative of a supply voltage applied to each microprocessor, and the diagnostic circuit is arranged to receive and monitor the signals and to determine that the supply voltage is within an allowable safe range.

5. The motor bridge driver integrated circuit according to claim 1 which includes a first serial peripheral interface bus (SPI) that handles signals to and from the first microprocessor and a second serial peripheral interface (SPI) bus that handles signals from the second microprocessor and in which each SPI is configured to communicate information from the microprocessor to the bridge driver, under the influence of the arbitration circuit, and optionally to communicate information on the status of the bridge driver back to the respective microprocessor.

6. A motor circuit comprising:
a multiphase electric motor;
at least one motor bridge for selectively connecting each phase of the motor to a supply voltage in response to motor phase switching signals from a motor bridge driver integrated circuit;
a first microprocessor that generates a first set of control signals indicative of the voltage waveforms to be applied to each phase of the motor;
a second microprocessor that generates a second set of control signals indicative of the voltage waveforms to be applied to each phase of the motor; and
a motor bridge driver integrated circuit comprising:
a first set of input ports arranged to receive control signals from the first microprocessor,
a second set of input ports arranged to receive control signals from the second microprocessor,
a motor bridge driver including at least one set of output ports arranged to output motor phase switching signals to the motor bridge;
a diagnostic circuit which receives and monitors the control signals received from the two microprocessors and from those signals determines which microprocessor is to be treated as a master microprocessor and which is to be treated as a slave microprocessor at any given time by the motor bridge driver; and
an arbitration circuit that selectively enables only the master microprocessor to the take control of the motor bridge at any given time whilst preventing the slave microprocessor from taking control of the motor bridge, wherein the diagnostic circuit, arbitration circuit and motor bridge driver are provided as a single integrated circuit on a single chip of semiconductor material.

7. The motor circuit according to claim 6 in which each microprocessor includes a control signal generating circuit that generates control signals that are sent to the motor bridge driver integrated circuit.

8. The motor circuit according to claim 6 in which the motor bridge driver integrated circuit is adapted to send one or more signals to each microprocessor comprising:
one or more error signals indicating any errors in the function of a part of the motor bridge driver or motor bridge;
a current signal dependent upon the current flowing in one or more phases of the motor that is controlled by the motor bridge driver integrated circuit;
one or more serial peripheral interface signals that are used to control the timing and synchronisation of signals between each microprocessor and the motor bridge driver integrated circuit; and
one or more signals instructing the microprocessor that it is acting as the master microprocessor or as the slave microprocessor and status information about the motor bridge driver.

9. A method of operating a motor using a motor circuit comprising a multiphase electric motor, at least one motor bridge for selectively connecting each phase of the motor to a supply voltage in response to motor phase switching signals from a motor bridge driver integrated circuit; a first microprocessor that generates a first set of control signals indicative of the voltage waveforms to be applied to each phase of the motor; a second microprocessor that generates a second set of control signals indicative of the voltage waveforms to be applied to each phase of the motor; and a motor bridge driver integrated circuit comprising: a first set of input ports arranged to receive control signals from the first microprocessor, a second set of input ports arranged to receive control signals from the second microprocessor, a motor bridge driver including at least one set of output ports arranged to output motor phase switching signals to the motor bridge; a diagnostic circuit which receives and monitors the control signals received from the two microprocessors and from those signals determines which microprocessor is to be treated as a master microprocessor and which is to be treated as a slave microprocessor at any given time by the motor bridge driver; and an arbitration circuit that selectively enables only the master microprocessor to the take control of the motor bridge at any given time whilst preventing the slave microprocessor from taking control of the motor bridge, wherein the diagnostic circuit, arbitration circuit and motor bridge driver are provided as a single integrated circuit on a single chip of semiconductor material, the method comprising:
at a first time designating the first microprocessor as the master microprocessor and the second microprocessor as the slave microprocessor;
whereby in the event that the results of the diagnostic analysis indicate that the master microprocessor is functioning correctly causing the arbitration circuit to supply the bridge driver with control signals from the master microprocessor only and in the event that the results of the diagnostic analysis indicate that the master microprocessor is functioning correctly causing the arbitration circuit to supply the bridge driver with control signals from the slave microprocessor only.

* * * * *